United States Patent [19]

Irie et al.

[11] Patent Number: 5,073,612

[45] Date of Patent: Dec. 17, 1991

[54] HYDROPHILIC POLYMER AND METHOD FOR PRODUCTION THEREOF

[75] Inventors: Yoshio Irie; Shigeyasu Morihiro, both of Himeji; Teruaki Fujiwara, Nagaokakyo; Masazumi Sasabe, Kakogawa; Kaoru Iwasaki, Ibo, all of Japan

[73] Assignee: Nippon Shokubai Kagaku Kogyo, Co., Ltd., Osaka, Japan

[21] Appl. No.: 290,518

[22] Filed: Dec. 27, 1988

[30] Foreign Application Priority Data

Dec. 28, 1987 [JP] Japan ................. 62-329534
Oct. 17, 1988 [JP] Japan ................. 63-259542

[51] Int. Cl.$^5$ .............................................. C08F 6/26
[52] U.S. Cl. .................... 526/240; 526/241; 526/318.42; 528/481; 528/502
[58] Field of Search ............ 526/318.42, 240, 241; 528/481, 502

[56] References Cited

U.S. PATENT DOCUMENTS

| 4,041,231 | 8/1977 | Gross et al. | 526/318.42 |
| 4,061,846 | 12/1977 | Gross et al. | 526/318.42 |
| 4,066,583 | 1/1978 | Spaulding | 526/318.42 |
| 4,224,427 | 9/1980 | Mueller et al. | 526/318.42 |
| 4,267,103 | 5/1981 | Cohen | 526/318.42 |
| 4,800,220 | 1/1989 | Ribba | 526/318.42 |
| 4,861,539 | 8/1989 | Allen et al. | 264/210.2 |

FOREIGN PATENT DOCUMENTS

| 54-30710 | 10/1979 | Japan . |
| 55-108407 | 8/1980 | Japan . |
| 56-36504 | 4/1981 | Japan . |
| 56-141308 | 11/1981 | Japan . |
| 56-161413 | 12/1981 | Japan . |
| 57-151661 | 9/1982 | Japan . |
| 58-71907 | 4/1983 | Japan . |
| 60-1205 | 1/1985 | Japan . |
| 62-205171 | 9/1987 | Japan . |
| 62-265364 | 11/1987 | Japan . |
| 63-159405 | 2/1988 | Japan . |

Primary Examiner—Bernard Lipman
Attorney, Agent, or Firm—Omri M. Behr

[57] ABSTRACT

A hydrophilic polymer having the water absorption capacity thereof 1 to 30 times to its own weight by a process of manufacture which comprises preparing a monomer component comprising (a) 2 to 25 mol % of a hydroxyl group-containing alpha,beta-ethylenically unsaturated monomer, (b) 5 to 30 mol % of a carboxyl group-containing alpha,beta-ethylenically unsaturated monomer, and (c) 93 to 45 mol % of a carboxylate group-containing alpha,beta-ethylenically unsaturated monomer, providing that the total of (b) and (c) is in the range of 98 to 75 mol %, radically polymerizing said monomer component, and heat-treating the resultant polymer thereby causing the hydroxyl group and carboxyl group possessed by the polymer to react with each other and form a crosslinked structure, a method for the production thereof, and uses found therefor including a cation sequestrating resin, a coolant and a coating material.

10 Claims, No Drawings

HYDROPHILIC POLYMER AND METHOD FOR PRODUCTION THEREOF

BACKGROUND OF THE INVENTION

1. Field of the Invention

This invention relates to a hydrophilic polymer, a method for the production thereof, and uses found therefor. More particularly, this invention relates to a hydrophilic polymer assuming hygroscopicity owing to the inclusion in its molecular unit of a carboxyl group, a carboxylate group, and a hydroxyl group and nevertheless having its own water absorption ratio being 1 to 30 times to the own weight owing to the mutual reaction of the carboxyl group and hydroxyl group, a method for the production thereof, and uses found therefor.

2. Description of the Prior Art

In recent years, the so-called water-absorbing polymer, i.e. such polymers which are insoluble in water and capable of absorbing water, have come to be used widely in the field of civil engineering, the field of agriculture and forestry, the field of sanitary articles, etc. which by nature are allowed to take full advantage of the polymers' ability to absorb and retain water.

For the production of these water-absorbing polymers, a method which simultaneously polymerizes and self-crosslinks a hydrophilic monomer in the presence of a crosslinking agent (Japanese Patent Publication SHO 54(1979)-30,710), a method which polymerizes a hydrophilic monomer in the presence of a small amount of a crosslinking monomer (Japanese Patent Laid-Open SHO 58(1983)-71,907), a method which polymerizes partially neutralized acrylic acid in the presence of a water-soluble polyhydric alcohol and a surfactant (Japanese Patent Laid-Open SHO 55(1980)-108,407), a method which causes a polyepoxy compound to react with a copolymer comprising an alpha-olefin and/or a vinyl compound and maleic anhydride (Japanese Patent Laid-Open SHO 56(1981)-36,504), and a method which polymerizes a monomer containing 2-hydroxyethyl acrylate and acrylic acid or a metal salt thereof in the presence of a crosslinking agent with the monomer concentration kept over 35% by weight and, during the course of the polymerization, causes self-crosslinking of the monomer in process of polymerization (Japanese Patent Laid-Open SHO 56(1981)-161,413), for example, have been proposed.

The water-absorbing polymers obtained by these known methods have water absorption ratios so large as to take up and hold purified water approximately to 200 to 1,000 times their own volume and, therefore, are uses for which these polymers prove to be totally unfit because their characteristically large water absorption ratios are rather detrimental than otherwise. When these water-absorbing polymers are used in sheets for preventing dew condensation, sheets for regulating moisture, or fabrics for absorbing perspiration and moisture as attached fast to their fibers by a suitable means, they are often swelled to an unduly large extent and take a long time before they release the absorbed water by evaporation and resume their former dry state. At time, they are overswelled possibly to a point where sheets sustain fracture or the polymers come off the sheets or fibers. This phenomenon is particularly conspicuous when the water-absorbing polymers are amply used for the enhancement of hygroscopicity and ability to prevent dew condensation.

When water-absorbing polymers of high absorption ratios are used in water stop packings which comprise rubber and a water-absorbing polymer incorporated in the rubber, the packings absorb water possibly in such a large volume as to swell their rubber matrixes excessively and require a very long time before they are fully dried. In an extreme case, the abosorbed water may cause fracture of the rubber matrixes and deprive the packings of usefulness.

Water-absorbing polymers are generally handled in the form of powder and, therefore, are prone to entail a disadvantage that the powder is caked with absorbed moisture or drifted readily in the form of dust. This disadvantage can be eliminated in the case of water-absorbing polymers which are capable of being handled in the form of aqueous dispersion or aqueous slurry. Unfortunately, however, the conventional water-absorbing polymers of high water absorption ratios are not easily transformed into an aqueous dispersion or aqueous slurry. In the circumstances, a hygroscopic polymer which has the water absorption ratio thereof lowered to a point where the polymer used in a water stop sheet, for example, does not suffer the moisture or water absorbed therein to cause either fracture of the matrix of sheet or component fibers thereof or separation of the polymer from the sheet and which is capable of being transformed into an aqueous dispersion has a prospect of finding a great demand.

A water-absorbing polymer having the capacity for water absorption repressed ideally as described above could be obtained from the conventional water-absorbing polymer by suitably increasing the crosslinking degree thereof. When this increase of the crosslinking degree is effected by a method using a polyhydric alcohol in a large amount, the treatment must be performed at an elevated temperature for a long time for the polymerization degree to be sufficiently heightened. Further, the polyhydric alcohol suffers from low crosslinking efficiency because it readily vaporizes or passes into the ambient air. When the increase of the crosslinking degree is performed by a method using in a large amount a crosslining monomer possessing two or more unsaturated groups in the molecular unit thereof, the crosslinking proceeds unevenly and the crosslinking monomer which is noxious inherently remains in its unaltered form because the crosslinking monomer is sparingly soluble in a water-soluble (hydrophilic) monomer. Thus, this method suffers from poor safety and high cost. In the case of a method which effects the desired increase of the crosslinking degree by the reaction of a polyepoxy compound with a water-soluble polymer, there arises a possibility of the polyepoxy compound remaining after the reaction and inducing the drawbacks of toxicity and high cost.

As builders for detergents, phosphates, water-soluble high molecular electrolytes, and zeolites have been known heretofore to the art. Of these detergent builders, phosphates and water-soluble high molecular electrolytes are soluble in water and excellent in ability to sequestrate polyvalent metal ions in hard water, ability to purge fabrics of solid particulate stain, and ability to prevent removed defiling particles from adhering again to fabrics in process of cleaning. From the standpoint of preserving water from pollution, the phosphates have disadvantage that they possibly form a cause for the phenomenon of eutrophication of water. The water-soluble high molecular electrolytes which may be represented by sodium salts of carboxylate such as polyacrylic acid, polymaleic acid, and acrylic acid-maleic acid copolymer are deficient in biodegradability and, to be sufficiently effective, must be used in a large amount and inevitably are disadvantageous in that they entail environmental pollution. In contrast, the zeolites which are a water-insoluble inorganic particulate substance do not cause so heavy water pollution as the aforementioned phosphates and water-soluble high molecular electrolytes but are deficient in ability to sequestrate polyvalent metal ions. Recently, the problems such as undue abrasion of washing machines by zeolites have come to arouse serious concern.

In the circumstances, several water-insoluble organic detergent builders improved in ability to sequestrate polyvalent metal ions have been proposed. For example, West German Patent No. 2,055,423 discloses a method which uses a polymer crosslinked as with divinylbenzene, West German Patent No. 2,216,467 discloses a method which uses a cation exchanger obtained by impregnating a flat fibrous matrix as with a polymer containing a carboxyl group, and West German Patent No. 2,307,923 discloses a method which uses what is obtained by impregnating a porous matrix with a mixed monomer of a crosslinking agent containing two or more double bonds and an ethyleic double bond and subsequently polymerizing the mixed monomer lodged in the matrix. The polymers involved in these proposed methods are invariably water-impregnable crosslinked polymers obtained by using as a comonomer a crosslinked monomer containing two or more double bonds.

These water-impregnable crosslinked polymers, however, have a disadvantage that they exhibit a weak gel strength in an impregnated state and, during the course of laundering, undergo disintegration and induce unwanted adhesion to laungered articles when the crosslinking monomer is used in an unduly small amount. If the amount of the crosslinking monomer to be used is unduly large, they have a disadvantage that for a certain unknown cause, the crosslinking monomer survives the reaction possibly to a point where the safety of polymer is jeopardized. Further, since not so large amount of the crosslinking monomer is soluble in water, a method which comprises conducting the polymerization in the state of an aqueous solution of unneutralized carboxylic group-containing monomer having the crosslinkable monomer dissolved therein, and after the completion of the polymerization, neutralizing the resultant polymer has been proposed. This method, however, inevitably grows heavily in intricacy. The crosslinking monomer itself is very expensive. Thus, these polymers have not been fully developed to a practicable level.

Moreover, such water-soluble organic high molecular compounds as agar, gelatin, polyvinyl alcohol, polyethylene glycol, and partially crosslinked derivatives thereof which have been heretofore used as a coolant have a nature such that when they are cooled below 0° C. in their water-containing state, the resultant gels are frozen hard and deprived totally of flexibility. Thus, they have a disadvantage that when they are used in cooling human bodies and foodstuffs, they exhibit a poor ability to come into close contact with the contours of the objects being cooled. During their use on human bodies, the frozen gels impart unpleasant sensation due to the hardness. When the frozen gels are used on foodstuffs, they inflict injuries to the foodstuffs or their wrappers. A proposal has been made to use as a coolant a hydrated gel of a highly absorbent resin such as slightly crosslinked sodium polyacrylate which takes up water approximately to 100 to 1,000 times its own weight. The hydrated gel has found favorable utility in products such as paper diaper, sanitary napkin, and agricultural-horticultural coolants which require a large capacity for water absorption. For the function as a coolant, the hydrated gel's large ability to absorb water is not utilized to advantage. Conversely, the hydrated gel is not fully satisfactory in the flexibility in a frozen state which is an important requirement for a coolant. Regarding the function to be expected of a coolant, the capacity for absorption of water is not required to be very large. The hydrated gel, however, is not fully satisfactory in flexibioity, an important requirement to be satisfied by the hydrated gel destined to be used in a frozen state as a coolant.

For the elimination of these drawbacks of the conventional products as described above, there has been proposed a method which produces a gel incapable of freezing by causing the aforementioned water-soluble high molecular compound or highly absorbent resin to absorb an aqueous solution containing a polyhydric alcohol. This gel is deficient in the quality of a coolant because it is incapable of utilizing the latent heat of melting of ice. The coolants using the conventional highly absorbent resins have a disadvantage that when they are left standing under the sunlight or at elevated temperature for a long time, they gain much in viscosity and lose softness in a great measure during the course of freezing.

As a coating material for proofing a given substrate against dew condensation, there has been proposed a product which is vested with a water-absorbing property by the addition of an absorbent body pigment such as diatomaceous earth, pearlite, or zeolite beside such ordinary paint components as synthetic resin emulsion, coloring pigment, pigment dispersant, tackifier, fungicide, and antiseptic (Japanese Patent Laid-Open SHO 57(1982)-151,661). This coating material is deficient in ability to prevent dew condensation because it has no satisfactory ability to absorb water. If the absorbent body pigment is used in a large amount for the purpose of enhancing the ability to absorb water, the coating material is no longer capable of forming a film rich in strength.

For the elimination of the drawbacks suffered as described above by the coating material capable of proofing a substrate against dew condensation owing to the use of an absorbent body pigment, there has been proposed a coating material adapted to proof a substrate against dew condensation by the incorporation of a highly absorbent resin (Japanese Patent Laid-Open SHO 62(1987)-205,171 and SHO 62(1987)-265,364). This coating material for proofing substrates against dew condensation owing to the incorporation of a highly absorbent resin enjoys an improved ability to absorb water and consequently exhibits an improved ability to preclude dew condensation. The highly absorbent resin has a capacity for taking up water approximately to 50 to 1,000 times its own weight. Since it absorbs water excessively, it requires a long time in releasing the absorbed moisture. Since it is swelled greatly with absorbed water, the film formed with the coating material is deprived of surface smoothness by addition of only a small amount of water. The film sustains cracks because the difference of swelling and contraction of the film during the repeated cycles of admission and release of water is large. In the case of a water paint, if this paint incorporates therein the highly absorbent resin in a required amount, it acquires unduly high viscosity or undergoes heavy gelation to a point where the produced paint is effectively applied to a given surface only with difficulty.

An object of this invention, therefore, is to provide a novel hydrophilic polymer, a method for the production thereof, and uses for the polymer.

Another object of this invention is to provide a hydrophilic polymer having 1 to 30 times of absorption ratio to the own weight.

Yet another object of this invention is to provide a novel cation sequestrating resin, a coolant, and a coating material for proofing a substrate against dew condensation.

SUMMARY OF THE INVENTION

The objects described are attained by a hydrophilic polymer having the water absorption capacity thereof 1 to 30 times its own weight by a process of manufacture which comprises preparing a monomer component comprising (a) 2 to 25 mol % of a hydroxyl group-containing alpha,beta-ethylenically unsaturated monomer, (b) 5 to 30 mol % of a carboxyl group-containing alpha,beta-ethylenically unsaturated monomer, and (c) 93 to 45 mol % of a carboxylate group-containing alpha,beta-ethylenically unsaturated monomer, providing that the total of (b) and (c) is in the range of 98 to 75 mol %, radically polymerizing the monomer component, and heat-treating the resultant polymer thereby causing the hydroxyl group and carboxyl group possessed by the polymer to react with each other and form a crosslinked structure.

The objects are also accomplished by a method for the production of a hydrophilic polymer having the water absorption capacity thereof 1 to 30 times its own weight, which method comprises preparing a monomer component comprising (a) 2 to 25 mol % of a hydroxyl group-containing alpha,beta-ethylenically unsaturated monomer, (b) 5 to 30 mol % of a carboxyl group-containing alpha,beta-ethylenically unsaturated monomer, and (c) 93 to 45 mol % of a carboxylate group-containing alpha,beta-ethylenically unsaturated monomer, providing that the total of (b) and (c) is in the range of 98 to 75 mol %, aqueous solution polymerizing the resultant monomer component in the presence of a radical polymerization initiator, and subjecting the resultant polymer to a heat treatment at a material temperature in the range of 130° to 250° C. for a period in the range of 10 minutes to 20 hours thereby causing the hydroxyl group and carboxyl group possessed by the polymer to react with each other and form a crosslinked structure.

These objects are further accomplished by a cation sequestrating resin formed of a hydrophilic polymer having the water absorption property thereof 1 to 30 times its own weight.

These objects are accomplished by a coolant formed of a hydrophilic polymer having the water absorption property thereof in the range of 1 to 30 times its own weight.

These objects are also accomplished by a coating material for proofing a substrate against dew condensation, comprising a hydrophilic polymer having the water absorption property thereof in the range of 1 to 30 times its own weight and a synthetic resin emulsion.

EXPLANATION OF THE PREFERRED EMBODIMENT

The hydroxyl group-containing alpha,beta-unsaturated ethylenically unsaturated monomer [hereinafter referred to as "monomer (a)"] to be used in the present invention may be a water-soluble monofunctional monomer containing a sole hydroxyl group in the molecular unit thereof or a polyfunctional monomer containing two or more hydroxyl groups in the molecular unit thereof. As typical examples of the monomer (a), allyl alcohol; hydroxyalkyl esters of vinyl carboxylic acid monomers such as 2-hydroxyethyl acrylate, 2-hydroxypropyl acrylate, 3-hydroxypropyl acrylate, 4-hydroxybutyl acrylate, 2-hydroxyethyl methacrylate, 2-hydroxypropyl methacrylate, 3-hydroxypropyl methacrylate, and 4-hydroxybutyl methacrylate; di- and tri-alkylene glycol momo(meth)acrylates such as diethylene glycol momoacrylate, triethylene glycol momoacrylate, dipropylene glycol momoacrylate, tripropylene glycol momoacrylate, diethylene glycol monomethacrylate, triethylene glycol monomethacrylate, dipropylene glycol monomethacrylate, and tripropylene glycol monomethacrylate; polyalkylene glycol mono(meth)acrylates (providing that the number of repeating units of alkylene is in the range of 4 to 50); mono(meth)acrylates of polyhydric alcohols such as glycerol mono(meth)acrylate, neopentyl glycol mono(meth)acrylates, and pentaerythritol mono(meth)acrylates may be mentioned. These monomers (a) may be used either singly or jointly in the form of a mixture of two or more members. Of course, a monomer such as vinyl alcohol which, though incapable of existing by itself, is enabled to form a hydroxyl group by being polymerized with vinyl acetate and subsequently saponified can be used as a monomer (a).

The carboxyl group-containing alpha,beta-ethylenically unsaturated monomer [hereinafter referred to as "monomer (b)"]is soluble in water. Typical examples of the monomer (b) include acrylic acid, methacrylic acid, maleic acid, and itaconic acid. .Among other monomers (b) mentioned above, acrylic acid and methacrylic acid prove to be particularly preferable. One member or a mixture of two or more members selected from the monomers (b) cited above may be used.

The carboxylate group-containing alpha,beta-ethylenically unsaturated monomer [hereinafter referred to as "monomer (c)"]is soluble in water. As typical examples of the monomer (c), alkali metal salts and ammonium salts of the carboxyl group-containing alpha,beta-ethylenically unsaturated monomers (b) may be cited. One member or a mixture of two or more members selected from the monomers (c) mentioned above may be used.

When the polymer obtained by the aqueous solution polymerization of the monomer component mentioned above is subjected to the heat treatment, the hydroxyl group and carboxyl group contained in the molecular unit of the polymer undergo a reaction of esterification and consequent crosslinking to give a three-dimensional structure to the polymer. For the produced polymer to be hydrophilic and to exhibit a water absorption ratio of 1 to 30 times its own weight, the content of the monomer (a) is required to be in the range of 2 to 25 mol %, preferably 5 to 20 mol %, the content of the monomer (b) in the range of 5 to 30 mol %, preferably 10 to 30 mol %, and the content of the monomer (c) in the range of 93 to 45 mol %, preferably 85 to 5 mol %, providing that the total of the monomer (b) and the monomer (c) is in the range of 98 to 75 mol %, preferably 95 to 80 mol %. If the amount of the monomer (a) is less than 2 mol % and/or that of the monomer (c) is less than 5 mol %, the produced polymer has an insufficient crosslinking density, accordingly the produced polymer has too high water absorption ratio to be difficult to accomplish the object of the present invention. Because the water absorption capacity which the polymer acquires after the formation of the crosslinked structure is mainly originated in the carboxylate group possessed by the crosslinked polymer in the molecular unit thereof, when the amount of the monomer (c) is less than 45 mol %, it is difficult for the produced polymer to acquire a proper water absorption ratio, outstanding hygroscopicity and excellent cation exchangeability, being the characteristics of the present invention. Conversely, if the amount of the monomer (a) is more than 25 mol % and that of the monomer (b) is more than 30 mol %, though the polymer possessing the water absorption ratio not less than once to the own weight may be obtained, such polymer has few need from the practical viewpoint. It is preferable for the sake of promoting the ester crosslinking reaction more efficiently, in the proportion of the monomer (a) to the monomer (b), to use the monomer (b) more than the monomer (a).

The monomer component of the present invention may additionally incorporate therein other alpha,beta-ethylenically unsaturated monomer copolymerization with the monomer component in a ratio not so high as to impair the ester crosslinking density or the water absorption ratio. This additional monomer is desired to be soluble in water. Examples of this additional monomer include 2-acrylamide-2-methylpropane sulfonic acid, sulfoethyl (meth)acrylates, 2-(meth)acryloylethane sulfonic acid, acrylamide, N-methylol acrylamide, acrylonitrile, methyl (meth)acrylates, ethyl acrylate, isopropyl acrylate, butyl acrylate, dimethyl maleate, diethyl maleate, dibutyl maleate, and vinyl acetate. The amount of this additional monomer to be used is desired to be less than 29 mol %, preferably to be in the range of 0 to 20 mol %, per the total amount of the monomers mentioned above.

Further, the monomer component may incorporate therein a crosslinking monomer containing two ore more unsaturated groups in the molecular unit thereof. This crosslinking monomer is desired to be soluble in water. Typical examples of this crosslinking monomer include ethylene glycol diacrylate, ethylene glycol dimethacrylate, diethylene glycol diacrylate, diethylene glycol dimethacrylate, triethylene glycol monoacrylate, triethylene glycol dimethacrylate, polyethylene glycol di(meth)acrylates, polypropylene glycol di(meth)acrylates, glycerol di(meth)acrylates, glycerol tri(meth)acrylates, trimethylol propane diacrylate, trimethylol propane dimethacrylate, trimethylol propane triacrylate, trimethylol propane trimethacrylate, neopentyl glycol di(meth)acrylates, N,N'-methylene bisacrylamide, and N,N'-methylene bismethacrylamide. When the crosslinking monomer is used in the monomer component, it lends itself to shorten the time required for the heat treatment performed for the ester crosslinking of the monomer component, preclude the otherwise possible degradation of the polymer due to a protracted heating at an elevated temperature, ensure formation of a polymer of high quality. A gel-like polymer obtained without crosslinking monomer has markedly adherence of the surface thereof and, hence, such handling as finely cutting for the sake of making dry easy or filtering suspended substances, it difficult. For this reason, use of the crosslinking agent in a small amount makes the adherence of the gel polymer surface lower and handling thereof easy, so that it is preferable. The amount of this crosslinking monomer is in the range of 0.001 to 0.5 mol %, preferably 0.01 to 0.3 mol %, based on the monomer component.

The hydrophilic polymer having the water absorption capacity repressed advantageously as contemplated by the present invention possesses a water absorption ratio of 1 to 30 times its own weight, preferably falling in the range of 2 to 20 times its own weight. If the water absorption ratio exceeds 30 times the own weight, the gel of the polymer swelled with absorbed water is poor in strength, liable to be deteriorated by ultraviolet light, and difficult of dispersion in an aqueous medium.

For the radical polymerization of the monomer component, the method of aqueous polymerization heretofore employed for the polymerization of a water-absorbing polymer can be used in its unmodified form. This radical polymerizaiton can be easily carried out, for example, by a method which comprises forming a plurality of cavities by superposing compressively a plurality of horizontal frames adapted to form tightly closed cavities on being joined by superposition and provided with heat transfer surfaces and bult-in heat medium passages adapted to manifest the function of a polymerization reaction temperature regulator, charging the cavities with at least one monomer or a monomer solution, passing a heat medium through the plurality of heat medium passages thereby keeping the temperature of the polymerization reaction system through the medium of the heat transfer surfaces at a level within a desired range and polymerizaing the monomer, and on completion of the polymerization, relieving the joined horizontal frames of the pressure and removing the produced polymer therefrom as disclosed in Japanese Patent Publication SHO 48(1973)-42,466, a method which effects radical aqueous solution polymerization of a monomer destined to form a hydrated polymer by continuing the polymerization in a container provided with a plurality of rotary stirring shafts and, with the advance of the polymerization, finely dividing the polymer as formed by virtue of the shearing force generated by the rotation of the stirring shafts as disclosed in Japanese Patent Laid-Open SHO 57(1982)-34,101 and U.S. Pat. No. 4,625,001, or a reverse phase suspension polymerization method as disclosed in Japanese Patent Publication SHO 59(1984)-37,003.

The polymerization initiator to be used in the present invention may be any of the water-soluble radical polymerization initiators heretofore known in the art. As examples of the polymerization initiator, persulfates such as potassium persulfate, sodium persulfate, and ammonium persulfate, and water-soluble azo compounds such as 2,2'-azobis(2-amidinopropane) hydrochloride (produced by Wako Junyaku K. K. and marketed under product code of "V-50") may be cited. A redox type initiator is also available for the same purpose. Examples of the redox type initiator include combinations of those compounds mentioned above as examples of water-soluble radical polymerization initiator with such reducing agents as hydrogensulfites like sodium hydrogensulfite and potassium hydrogensulfite, sulfites like sodium sulfite and potassium sulfite, thiosulfates like sodium thiosulfate and potassium thiosulfate, L-ascorbic acid, and ferrous salts. The amount of the polymerization initiator to be used is in the range of 0.001 to 0.5% by weight, preferably 0.002 to 0.3% by weight, based on the total amount of the monomers. The temperature of the aqueous solution polymerization is in the range of 10° to 120° C., preferably 30 to 100° C. The concentration of the monomer component in the aqueous solution is 10 to 70% by weight, preferably 20 to 60% by weight.

The polymer which is obtained as described above is subjected, either during or after the course of drying to a heat treatment at a material temperature in the range of 130° to 250° C., preferably 150° to 250° C., for a period in the range of 10 minutes to 20 hours, preferably 10 minutes to 10 hours, so that the polymer is enabled to induce ester crosslinking of the hydroxyl group and the carboxyl group contained in the molecular unit thereof. As the result, there is obtained a crosslinked hydrophilic polymer possessing a desired water absorption ratio in the range of 1 to 30 times to its own weight. By the method of the present invention, since the monomer component containing no crosslinking monomer or containing such a monomer in an irreducibly minimum amount required is subjected to the aqueous solution polymerization and the produced polymer is heated for crosslinking reaction, the aqueous solution polymerization can be carried out at a high monomer concentration and the degree of crosslinking can be controlled as desired by suitable selection of the conditions of the heating to permit easy manufacture of a hydrophilic polymer possessing a water absorption ratio of 1 to 30 times to its own weight. In this case, the temperature conditions for the drying or the heat treatment are as described above. If the temperature is lower than 130° C., since the reaction between the hydroxyl group and the carboxyl group does not easily proceed, it is difficult to obtain a hydrophilic polymer possessing a water absorption ratio of 1 to 30 times to its own weight. Conversely, if the temperature exceed 250° C., the produced hydrophilic polymer is poor in quality. Since the method of the production in accordance with the present invention, which has caused the carboxylic group-containing monomer to neutralize during the state of monomer, does not involves such complicated steps as step for post-neutralization of the polymer after polymerization and after heat treatment, it is excellent method capable of producing the product with good productability.

The hydrophilic polymer of this invention is obtained by the polymerization of a monomer component of a specific composition and this polymer is allowed to acquire a crosslinked structure owing to the esterification of the hydroxyl group and the carboxyl group contained in the molecular unit thereof. Thus, the polymer possesses hygroscopicity and, at the same time, has the water absorption ratio in the range 1 to 30 times to its own weight. Owing to the carboxylate group contained in a specific amount in the monomer component, the polymer notably abounds in hygroscopicity and enjoys an advantageously repressed water absorption ratio of 1 to 30 times to its own weight. The hydrophilic polymer of this invention, therefore, can be dispersed in an aqueous medium to form an aqueous dispersion. It suffers from only a small decline of gel strength even when it is exposed to a large volume of water. Owing to this behavior, the polymer can be favorably used in sheets proofed against dew condensation, moisture-regulating sheets, perspiration-absorbing fibrous products, etc.

The hydrophilic polymer of this invention excels in durability and lightproofness and possesses a proper water absorbing property and, therefore, is favorably used in water-retaining material for soil, water-swelling separating agent, agent for imparting hydrophilicity to plastic materials, antistatic agent, viscous fluid for electric appliances, static crushing agent, artificial snow, and chemical pocket warmer. Further the hydrophilic polymer of this invention enjoys extremely high safety because it has a notably small water-soluble polymer portion and contains unaltered crosslinking agent in a small amount. Owing to this quality, the polymer can be favorably used in sanitary absorbent or for drying fresh foodstuffs or preserving foodstuffs in a fresh state. The hydrophilic polymer of this invention further exhibits an excellent ability to sequestrate cations such as metal ions. It is capable of sequestrating calcium ions in a ratio of no less than 200 mg-$CaCO_3$/g, for example. The polymer, on exhaustion of the sequestrating capacity, can be easily regenerated with a mineral acid such as hydrochloric acid. Owing to this behavior, the polymer can be favorably used for softening hard water, treating waste water prior to release into bodies of water, recovering polyvalent metal ions, and refining water through removal of impurities. It is also useful as a detergent builder.

Further, in accordance with the method of this invention, from the polymer obtained by the polymerization performed under fixied conditions, the hydrophilic polymer possessing a varying water absorption ratio can be produced by suitably controlling the conditions to be used during the heat treatment. Thus, the method of this invention is highly advantageous even from the standpoint of productional efficiency.

The cation sequestrating resin (water conditioning agent) according to this invention, when incorporated in a detergent or added to the water in the washing machine, permits a saving in the amount of the detergent builder such as a phosphate, a water-soluble high molecular electrolyte, or synthetic zeolite which is the cause for the eutrophication or contamination of the water in rivers, lakes, etc. without a sacrifice of the deterging power. This water-conditioning agent excels in safety because a crosslinking agent containing two or more ethylenic double bonds in the molecular unit thereof is not used at all or used only in a very small amount and further because unaltered monomer or unalterd crosslinking agent remains in a very small amount in the produced polymer. Since this water-conditioning is insoluble in water, it can be removed easily by filtration or sedimentation from the waste water under treatment and it can be prevented from flowing into rivers or lakes by using the water-conditioning agent as contained in a water-pervious bag or packed in a water inlet conduit. Since the water absorption ratio is 1 to 30 times to its own weight, the water-conditioning agents absorbs water at a very high speed sequestrates cations also at a high speed.

The coolant of this invention exhibits softness even below 0° C. and excels in the ability to preserve coolness and fully endures the impacts of repeated use through freezing and thawing cycles. It also exhibits excellent shelf life when it is stored long in its unfrozen state. When the coolant of this invention is packed in a closed bag of polyvinyl chloride resin, polyethylene, or rubber and then cooled in a refrigerator, for example, the cooled bag can be used as a cooling pillow for man, a cooling mat for animal, or an efficient coolant for foodstuffs. It can be used repeatedly for this purpose. To be used effectively as a coolant, the hydrophilic polymer is desired to possess a water absorption ratio of 1 to 30 times, preferably 5 to 20 times, to its own weight.

For the hydrophilic polymer of this invention to be effectively used as a dew-preventing coating material, the coating material is required to contain the hydrophilic polymer and a synthetic resin emulsion as essential components.

The synthetic emulsion to be used in the coating material in an O/W type emulsion. Examples of the O/W type emulsion include the emulsions of acryl resin, urethane resin, chloroprene rubber, ethylene-vinyl acetate copolymer, styrene-butadiene rubber, and epoxy resin. These emulsions may be used singly or jointly as a blend of two or more members.

The hydrophilic polymer to be used in the present invention, in an atmosphere having a temperature of 20° C. and a relative humidity of 90%, exhibits a hygroscopicity of 30 to 130% by weight, preferably 50 to 130% by weight, and a water absorption ratio in the range of 1 to 30 times, preferably 2 to 20 times, to its own weight. If the hygroscopicity is less than 30% by weight, the film formed of the coating material absorbs water at an unduly low speed and exhibits no satisfactory ability to prevent dew condensation by a certain unknown mechanism.

If the water absorption ratio of the hydrophilic polymer is less than 1 time to its own weight, the hydrophilic polymer suffers from poor economy because it has a small capacity for water absorption and, therefore, must be used in an unduly large amount. If the water absorption ratio exceeds 30 times to its own weight, the film formed of the coating material possibly sustains cracks or loses surface smoothness by the impacts of repeated use through cycles of swelling and contraction. The film also has a disadvantage that it absorbs water excessively, takes much time in releasing absorbed moisture, and gathers mold. Depending on the water absorption ratio of the hydrophilic polymer and the amount of the polymer to be added, the synthetic resin emulsion coating material using this hydrophilic polymer may suffer from aggravation of viscosity and consequent gelation.

The particle diameter of the hydrophilic polymer is not specifically restricted. For the sake of surface smoothness of the film to be formed of the coating material, however, the particle diameter is desired to be no more than 200 microns, preferably no more than 100 microns. The ratio of the synthetic resin emulsion to the hydrophilic polymer in the coating material contemplated by the present invention may be suitably selected to fit the conditions of the intended use and the physical properties to be expected. It is generally such that the proportion of the hydrophilic polymer is in the range of 10 to 200 parts by weight, preferably 20 to 100 parts by weight, based on 100 parts by weight of the solids of the synthetic resin emulsion.

The dew-preventing coating material of the present invention can be used in various types of paper, plastics, woven fabrics, non-woven fabrics, inorganic building materials, ALC plates, steel sheets, and composites thereof as applied to either or both of the surfaces thereof or allowed to impregnated them.

The dew-preventing coating material can be prepared without requiring any special process. It is produced by sequentially adding the ingredients of the coating material to a suitable dispersing machine such as, for example, a ball mill, a sand mill, or a high speed mill and homogeneously mixing and dispersing them in the machine. On the surface of a substrate, the produced dew-preventing coating material can be applied in the form of a film by any of the known coating methods such as, for example, spraying, brushing, roller coating, trowel coating, flow coating, application with a flow coater, and application with a roller coater. Otherwise, it can be incorporated in the substrate by impregnation.

The dew-preventing coating material of this invention is characterized by the fact that it exhibits an outstanding ability to prevent condensation when it is in the form of a film and also by the fact that the film of this coating material releases absorbed moisture quickly, retains high surface smoothness during the course of water absorption, and avoids sustaining any crack during repeated use through cycles of absorption and release of moisture.

Since the coating material of this invention contains a polymer of high hygroscopicity, it exhibits a highly satisfactory moisture-controlling function when it is used in the linings of warehouses, closets, and other containers such as clothes boxes which require relatively high airtightness.

Now, the present invention will be described more specifically below with reference to working examples. This invention is not limited to the working examples so cited but may be practiced otherwise without departing from the spirit of the invention disclosed herein.

Example 1

A jacketed stainless steel twin-arm kneader having an inner volume of 2.5 liters, an opening 150 mm × 150 mm in area, and a depth of 150 mm, and provided with two sigma type vanes 90 mm in diameter of rotation was fitted with a lid. In this kneader, 1,200 g of an aqueous solution of a monomer component comprising 67.5 mol % of sodium acrylate, 22.5 mol % of acrylic acid, 9.95 mol % of hydroxyethyl acrylate, and 0.05 mol % of N,N'-methylene bisacrylamide (monomer concentration 37% by weight) was placed and nitrogen gas was blown into displace the internal gas of the reaction system. Then, the two sigma type vanes were rotated at speeds of 67 and 56 rpm, hot water at 35° C. was passed through the jacket to heat the interior of the reaction system, and 0.5 g of ammonium persulfate and 0.5 g of sodium hydrogensulfite were added as polymerization initiators. After 5 minutes following the addition of the polymerization initiators, the monomer component began to polymerize. The temperature of the interior of the reaction system reached 83° C. after 20 minutes following the addition of the polymerization initiators. The gel polymer was divided into minute particles about 5 mm in diameter. The stirring of the contents of the reaction system was further continued. After 60 minutes following the start of the polymerization, the lid was removed from the kneader and the hydrated gel polymer was removed from the kneader. The hydrated gel polymer was dried in an ordinary hot air drier at 100° C. for 2 hours and then comminuted to obtain a powdered polymer (1). Part of this polymer (1) was heat-treated in a still drier at 180° C., one of the two aliquot parts thereof for one hour and the other aliquot part for 3 hours, to produce hydrophilic polymer (1) and (2).

The powdered polymer (1) and the hydrophilic polymers (1) and (2) were tested for water absorption ratio, residual amount of unaltered crosslinking agents, and hygroscopicity by the following methods. Further, water insoluble content (% by weight) of the hydrophilic polymer was determined by colloid titiation method. The results are shown in Table 1.

Water absorption ratio: A tea bag-like pouch (40 mm × 60mm) made of nonwoven fabric was packed evenly with 0.5 g of a powdery sample polymer was impregnated with deionized water and, after elapse of 60 minutes, dried on 10 sheets of tissue paper 120 × 200 mm in area (produced by Jujo Kimbary and marketed under trademark designation of "Kimwipe Wiper") to drain excess water, and weighed. The water absorption ratio was calculated by the following formula.

$$\text{Water absorption ratio} = \frac{\text{Weight (g) of powder after absorption} - \text{weight (g) of powder before absorption}}{\text{Weight (g) of powder before absorption}}$$

Residual amount of unaltered crosslinking agents: A powdery sample polymer, 1.0 g, was dispersed in 1,000 ml of deionized water, stirred for 2 hours, and passed through a Wattman filter paper GF/F (particle retaining capacity 0.7 μm). The filtrate was analyzed for the content of unaltered crosslinking agents by liquid chromatography.

Hygroscopicity: A powdery sample polymer, 0.2 g, was placed in an aluminum cup 50 mm in diameter and 10 mm in height and left standing for one week in a constant temperature constant-humidity container adjusted to a temperature of 20° C. and a relative humidity of 90%. The powder thus allowed to absorb moisture was weighed. The hygroscopicity of the sample was calculated by the following formula.

Hygroscopicity =

$$\frac{\text{Weight (g) of sample after absorption of moisture} - \text{water (g) of sample before moisture absorption}}{\text{Weight (g) of sample before moisture absorption}}$$

Example 2

A powdered polymer (2) was repeating the procedure of Example 1, except that the monomer component as composed of 60 mol % of sodium acrylate, 20 mol % of acrylic acid, and 20 mol % of hydroxyethyl acrylate. From part of the powdered polymer (2), hydrophilic polymers (3) and (4) were similarly produced, providing that the drying time was changed to 5 hours, because the polymer before drying has low crosslinking degree, so it was soft and was difficult to treat it and took 5 hours. These polymers were tested by following the procedure of Example 1. The results are shown in Table 1.

Control 1

When the procedure of Example 1 was repeated with a monomer component composed of 67.5 mol % of sodium acrylate, 22.5 mol % of acrylic acid, and 10 mol % of N,N'-methylene bisacrylamide, a uniform aqueous solution of the monomer component was not obtained because N,N'-methylene bisacrylamide was not dissolved.

Control 2

A comparative polymer (2) was obtained by following the procedure of Example 1, except that the monomer component of the same composition was contained in a concentration of 15% by weight in the aqueous solution. From this comparative polymer (2), comparative hydrophilic polymers (1) and (2) were produced. These polymers were tested by following the procedure of Example 1. The results are shown in Table 1.

Example 3

A powdered polymer (3) was obtained by following the procedure of Example 1, except that a monomer component composed of 67.5 mol % of sodium acrylate, 22.5 mol % of acrylic acid, 9.95 mol % of hydroxyethyl methacrylate, and 0.05 mol % of N,N'-methylene bisacrylamide was used instead. From the powdered polymer (3), hydrophilic polymers (5) and (6) were similarly produced. These polymers are shown in Table 1.

Example 4

A powdered polymer (4) was obtained by following the procedure of Example 1, except that a monomer component composed of 72 mol % of sodium acrylate, 23 mol % of acrylic acid, 4.95 mol % of hydroxyethyl methacrylate, and 0.05 mol % of N,N'-methylene bisacrylamide was used instead. Hydrophilic polymer (7) was similarly produced. These polymers are shown in Table 1.

It is clearly noted from Table 1 that the hydrophilic polymers produced by the method of this invention permitted aqueous solution polymerization at high monomer concentrations and showed satisfactory behaviors in terms of residual amount of unaltered cross-linking agents as compared with the comparative hydrophilic polymers (1) and (2) which were caused to lower the water absorption ratio below 20 times its own weight by a method not fulfilling the scope of this invention.

TABLE 1

|  |  | Example 1 | Example 2 | Example 3 | Example 4 | Control 1 | Control 2 |
| --- | --- | --- | --- | --- | --- | --- | --- |
| Composition of monomer component (mol %) | Sodium acrylate | 67.5 | 60 | 67.5 | 72 | 67.5 | 67.5 |
|  | Acrylic acid | 22.5 | 20 | 22.5 | 23 | 22.5 | 22.5 |
|  | Hydroxyethyl acrylate | 9.95 | 20 |  |  |  |  |
|  | Hydroxyethyl methacrylate |  |  | 9.95 | 4.95 |  |  |
|  | N,N'-methylene acrylamide | 0.05 |  | 0.05 | 0.05 | 10.0 | 10.0 |
| Monomer concentration in aqueous solution of monomer component (% by weight) |  | 37 | 37 | 37 | 37 | 37 | 15 |
| Time for heat treatment at 180° C. | No heat treatment |  |  |  |  |  |  |
|  | Powdery polymer | (1) | (2) | (3) | (4) | — | comparative (2) |
|  | Water absorption ratio (times) | 62 | 53 | 64 | 68 | — | 10.1 |
|  | Hygroscopicity (% by weight) | 85 | 82 | 86 | 89 | — | 84 |

TABLE 1-continued

|  | Example 1 | Example 2 | Example 3 | Example 4 | Control 1 | Control 2 |
| --- | --- | --- | --- | --- | --- | --- |
| 1 hour's heat treatment |  |  |  |  |  |  |
| Hydrophilic polymer | (1) | (3) | (5) | — | — | comparative (1) |
| Water absorption ratio (times) | 7.8 | 3.5 | 8.1 | — | — | 10.3 |
| Hygroscopicity (% by weight) | 84 | 81 | 84 | — | — | 83 |
| 3 hour's heat treatment |  |  |  |  |  |  |
| Hydrophilic polymer | (2) | (4) | (6) | (7) | — | comparative (2) |
| Water absorption ratio (times) | 4.8 | 2.5 | 4.3 | 17 | — | 10.5 |
| Amount of unaltered crosslinking agent (ppm) (Note 1) | ND (Note 2) | ND | ND | ND | — | 130 |
| Hygroscopicity (% by weight) | 85 | 81 | 84 | 87 | — | 84 |
| Content of water-solubles (% by weight) | 0.1 | 1.3 | 0.1 | 0.1 | — | — |
| Gel handling (Note 3) | ○ | X | ○ | ○ | — | — |

(Note 1) Amount of unaltered crosslinking agent - total amount of hydroxyethyl acrylate, hydroxyethyl methacrylate, and methylene bisacrylamide remaining in unaltered state.
(Note 2) ND Not detectable
(Note 3) The gel handling was determined by two-point scale, wherein ○ stands for good X for bad.

Example 5

The hydrophilic polymers (1) to (7) and the powdered polymers (1) to (4) obtained in Examples 1 to 3 and a commercially available highly absorbent polymer (produced by Nippon Shokubai Kagaku Kogyo Co., Ltd. and marketed under trademark designation of "Aqualic CA") were each mixed with purified water to a varying concentration indicated in Table 2. The resultant liquids were left standing for 60 minutes and then examined visually by way of testing for dispersibility in aqueous medium. The results are shown in Table 2.

The dispersibility was rated on a two-point scale, wherein:

○ stands for the state of mixture remaining in a liquid state and retaining fluidity.

X stands for the state of mixture remaining in a wholly gelled state and no longer retaining any fluidity.

It is clearly noted from Table 2 that the hydrophilic polymers of this invention possessing water absorption ratios of no more than 30 times to their own weight possessed hygroscopicity equal to that of polymers possessing water absorption ratios exceeding 30 times their own weight and nevertheless were dispersible in an aqueous medium.

TABLE 2

| Concentration of dispersion (% by eight) | Polymer | | | | | | | | | | | |
| --- | --- | --- | --- | --- | --- | --- | --- | --- | --- | --- | --- | --- |
|  | Hydrophilic polymer | | | | | | | Powdered polymer | | | | Aqualick |
|  | (1) | (2) | (3) | (4) | (5) | (6) | (7) | (1) | (2) | (3) | (4) |  |
| 1 | ○ | ○ | ○ | ○ | ○ | ○ | ○ | X | X | X | X | X |
| 3 | ○ | ○ | ○ | ○ | ○ | ○ | ○ | — | — | — | — | — |
| 5 | ○ | ○ | ○ | ○ | ○ | ○ | X | — | — | — | — | — |
| 10 | X | ○ | ○ | ○ | X | ○ | X | — | — | — | — | — |
| 20 | X | X | ○ | ○ | X | X | X | — | — | — | — | — |

(Note) The hygroscrpicity of Aqualick CA was 88% by weight (at 20° C. and R.H. 90%). The values of hygroscopicity of hydrophilic polymers (1) to (6) and powdered polymers (1) to (3) were as shown in Table 1.

Example 6

The powdered polymer (1) obtained in Example 1 was heat-treated for 3 hours at a varying temperature indicated in Table 3. The hydroscopic polymer consequently obtained was tested for water absorption ratio in the same manner as in Example 1. The results are shown in Table 3. It is noted from the table that the heat treatment at 100° C. brought about virtually no discernible change in the water absorption ratio and the heat treatment at 130° C. or over was effective in enhancing the water absorption ratio.

TABLE 3

|  | Temperature (°C.) | | | | |
| --- | --- | --- | --- | --- | --- |
|  | 100 | 130 | 150 | 200 | 250 |
| Water absorption ratio (times) | 62 | 18.9 | 12.3 | 4.0 | 4.0 |

Example 7

In a flask having an inner volume of 5,000 ml, provided with a reflux condenser, and having the inner gas displaced with nitrogen gas, 2,130 g of cyclohexane and 19 g of sorbitan monolaurate were placed and stirred at room temperature for solution of the surfactant. In the resultant solution in the flask, an aqueous monomer solution prepared by adding 1.3 g of potassium persulfate to 1,200 g of an aqueous solution containing 22.5 mol % of acrylic acid, 67.5 mol % of sodium acrylate, 9.95 mol % of 2- hydroxyethyl methacrylate, and 0.05 mol % of N,N'-methylene bisacrylamide (monomer component concentration 40% by weight) was added dropwise and suspended therein. The inner gas of the reaction system was again displaced thoroughly with nitrogen. Then, the contents of the flash were heated to and kept at temperatures in the range of 55° to 60° C., leaving the monomer component polymerizing for 3 hours. The formed polymer solution was passed through a filter. The polymer was dried in an ordinary hot air drier at 100° C. and then comminuted to obtain beads of polymer (A). Two aliquot parts of this polymer were dried in a still drier at 180° C. for 1 hour and 3 hours, to obtain hydrophilic polymer (B) and (C). The speherical polymer (A) and the hydrophilic polymers (B) and (C) were tested for residual amount of unaltered crosslinking agents and hygroscopicity in the same manner as in Example 1. The results are shown in Table 4.

TABLE 4

|  | Polymer (A) | Hydrophilic polymer (B) | Hydrophilic polymer (C) |
| --- | --- | --- | --- |
| Water absorption ratio (times) | 60 | 8.2 | 5.2 |
| Amount of unaltered crosslinking agent (ppm) | 6 | N.D. | N.D. |
| Hygroscopicity (% by weight) | 85 | 87 | 87 |

N.D.: not detectable

Example 8

The hydrophilic polymer (2) possessing a water absorption ratio of 4.8 times to its own weight (time of heat-treatment 3 hours) obtained in Example 1 was tested for the ability to sequestrate polyvalent metal ions, $Cu^{2+}$, $CR^{3+}$, $Hg^{2+}$, and $Ca^{2+}$ by the following method. The results are shown in Table 5. Method for testing ability to sequestrate polyvalent metal ions:

A sample, 0.3 g, was placed in 1,000 ml of an aqueous solution containing 100 ppm of $Cu^{2+}$, $Cr^{3+}$, $Hg^{2+}$, or $Ca^{2+}$ (prepared by using the reagent of $CuCl_2$, $CrCl_3.6H_2O$, $HgCl_2$, or $CaCl_2.2H_2O$), stirred for 2.0 hours. The resultant aqueous solution was tested for the unsequentrated metal ion concentration with an atomic absorption meter.

The results are shown in Table 5.

It is clearly noted from this table that the hydrophilic polymer (2) of this invention possessed an outstanding ability to sequestrate these polyvalent metal ions.

TABLE 5

|  | Ability of hydrophilic polymer (2) to sequestrate polyvalent metal ions |
| --- | --- |
| $Cu^{2+}$ | 520 |
| $Cr^{3+}$ | 340 |
| $Hg^{2+}$ | 260 |
| $Ca^{2+}$ | 152 |
| (as $CaCO_3$) | (380) |

Example 9

The test for detergency was performed as shown below for the purpose of examining the effectiveness of the hydrophilic polymer of this invention as a water-conditioning agent (resin for sequestration of cations).

In the test for detergency, soiled cloths of cotton were used as natural soiled cloth. The rating of the detergency obtained was conducted with unaided eyes by the Scheffe's one pair comparison method repeatedly using four samples (as symmetrized laterally). As a control, commercially available sodium tripolyphsphate was used with respect to each of the plots involved.

The conditions of detergency and the composition of a detergent used were as follows.

| i) Detergency: | |
| --- | --- |
| Concentration of detergent | 0.12% |
| Temperature of detergent | 25° C. |
| Time of detergency | 8 minutes |
| Washing machine used | Household grade swirling electric washing machine |
| Bath ratio | 1:30 |
| Water used | 3° DH tap water |
| ii) Rinsing: | |
| Water temperature | 25° C. |
| Time of use of washing machine for rinsing | 3 minutes |
| iii) Detergent composition: | |
| Sodium alkylbenzene sulfonate (LAS MW 346) | 20% |
| Builder (water-conditioning agent) | 25% |
| Sodium silicate, No. 2 | 5% |
| Anhydrous sodium carbonate | 3% |
| Carboxymethyl cellulose | 0.5% |
| Anhydrous sodium sulfate | 46.5% |

The results of the test for detergency are shown in Table 6. The rating was made on a 10-point scale, using the effect with sodium oxadiacetate taken as 0 and that with sodium tripolyphosphate as 10.

TABLE 6

| Bilder | | |
| --- | --- | --- |
| Commercrally available bilder (% by weight) | Hydrophilic polymer (% by weight) | Detergency rated |
| Sodium tripolyphosphate 100% | — | 10 |
| " 50 | (2) 50 | 11 |
| " 50 | (4) 50 | 12 |
| " 50 | (6) 50 | 11 |
| " 50 | (7) 50 | 13 |
| " 25 | (2) 75 | 10 |
| " 25 | (4) 75 | 10 |
| " 25 | (6) 75 | 9 |
| " 25 | (7) 75 | 11 |
| — 0 | (2)100 | 8 |
| — 0 | (4)100 | 9 |
| — 0 | (6)100 | 8 |
| — 0 | (7)100 | 9 |
| Sodium polyacrylate Mw 10000 100 | — | 9 |
| 50 | (7) 50 | 9 |
| 25 | (7) 75 | 9 |
| 0 | (7)100 | 8 |

Example 10

The hydrophilic polymer (water-conditioning agent) of the present invention was tested for chelating ability by the following method.

In a beaker having an inner volume of 50 ml and provided with a rotor, 10 mg of a builder (water-conditioning agent) placed therein and 50 ml of an aqueous $1.0 \times 10^{-3}$M clacium chloride solution added thereto were stirred for solution. Then, the resultant solution was adjusted to an ion strength, $\mu$, of 0.08 by addition thereto of 1 ml of an aqueous 4.0M potassium chloride solution and stirred in a constant temperature bath at 50° C. for 10 minutes. The solution resulting from the stirring was tested for calcium ion strength with an ion meter (produced by Toa Dempa Kogyo K. K. and marketed under product code of "IM-20E") using a calcium ion electrode (produced by Orion K. K. and marketed under model number "93-20"). The chelating ability was reported by the amount of calcium ion sequestrated with 1g of a given builder, as reduced to the calcium carbonate content (mg). The results are shown in Table 7.

TABLE 7

| Water-conditioning agent or builder | Chelating ability (Mg of $CaCO_3$/g) |
| --- | --- |
| Hydrophilic polymer (2) | 320 |
| (4) | 240 |
| (6) | 320 |
| (7) | 350 |
| Sodium tripolyphosphate | 250 |
| Sodium polyacrylate | 230 |

TABLE 7-continued

| Water-conditioning agent or builder | Chelating ability (Mg of CaCO$_3$/g) |
|---|---|
| Synthetic zeolite | 200 |

Example 11

A powdered polymer was obtained by following the procedure of Example 4, except that the proportion of N,N'-methylene bisacrylamide was changed from 0.05 mol % to 0.03 mol % and that of hydroxyethyl acrylate from 4.95 mol % to 4.97 mol %. This powdered polymer was heat-treated in a still drier at 180° C. for 3 hours to obtain a coolant grade polymer. This polymer was found to possess a water absorption ratio of 18.5 times to its own weight A coolant was produced by placing 100 parts by weight of the coolant grade polymer in 500 parts by weight of water and allowing the polymer to be swelled with water. A simple cooling material was produced by placing the coolant in a bag of polyethylene 18 cm×27 cm in area and closing the open end of the bag.

Example 12

A coolant was produced by mixing 100 parts by weight of the same coolant grade polymer as obtained in Example 11 with 500 parts by weight of water and 25 parts by weight of ethylene glycol and allowing the polymer to be swelled with the water and ethylene glycol. A simple cooling material was produced by placing the coolant in a bag of polyethylene 18 cm×27 cm in area and closing the open end of the bag.

Example 13

A coolant grade polymer was obtained by following the procedure of Example 11, except that a monomer component composed of 72 mol % of sodium acrylate, 22.5 mol % of acrylic acid, 5.48 mol % of hydroxyethyl methacrylate, and 0.02 mol % of N,N'-methylene bisacrylamide was used instead. This polymer was found to possess a water absorption ratio of 15.5 times to its own weight. A simple cooling material was produced from this polymer by following the procedure of Example 11.

Example 14

A coolant grade polymer was obtained by following the procedure of Example 11, except that a monomer component composed of 70 mol % of sodium acrylate, 20 mol % of acrylic acid, 9.95 mol % of hydroxyethyl acrylate, and 0.05 mol % of diethylene glycol diacrylate was used instead and the conditions of the heat treatment conducted on the powdered polymer were changed to 200° C. and 30 minutes. This polymer was found to have a water absorption ratio of 8.3 times to its own weight. A simple coolant material was produced from the polymer by following the procedure of Example 11.

Example 15

A coolant grade polymer was obtained by repeating the procedure of Example 11, except that a monomer component composed of 68 mol % of sodium acrylate, 22.5 mol % of acrylic acid, 9.48 mol % of hydroxyethyl acrylate, and 0.02 mol % of N,N'-methylene bisacrylamide was used instead. This polymer was found to possess a water absorption ratio of 5.5 times to its own weight. A simple coolant material was produced from this polymer by following the procedure of Example 11.

Control 3

A coolant grade polymer was obtained by following the procedure of Example 11, except that a monomer component composed of 74.9 mol % of sodium acrylate, 25 mol % of acrylic acid, and 0.1 mol % of N,N'-methylene bisacrylamide was used instead and the heat treatment given to powdered polymer was omitted. This polymer was found to possess a water absorption ratio of 152 times to its own weight. A simple coolant material was produced from this polymer by following the procedure of Example 11.

Control 4

A coolant grade polymer was obtained by following the procedure of Example 11, except that a monomer component composed of 67.5 mol % of sodium acrylate, 22.5 mol % of acrylic acid, and 2 mol % of methylene bisacrylamide was used in the form of an aqueous solution containing the monomer component in a concentration of 15% by weight and the heat treatment performed on the powdered polymer was omitted. This comparative polymer was found to possess a water absorption ratio of 35.5 times to its own weight. A simple coolant material was produced from this polymer by following the procedure of Example 11.

Control 5

A coolant grade polymer was obtained by repeating the procedure of Example 11, except that a monomer component composed of 45 mol % of sodium acrylate, 15 mol % of acrylic acid, 40 mol % of hydroxyethyl acrylate, and 0.03 mol % of N,N'-methylene bisacrylamide was used instead. This comparative polymer was found to possess a water absorption ratio of 0.7 times to its own weight. A hydrated gel was obtained by causing 200 parts by weight of this comparative polymer to be swelled with 700 parts by weight of water. A simple coolant material was produced from the hydrated gel by following the procedure of Example 11.

Control 6

A coolant grade polymer was obtained by following the procedure of Example 11, except that the heat treatment performed on the powdered polymer was omitted. This comparative polymer was found to possess a water absorption ratio of 90.2 times to its own weight. A simple coolant material was produced from this polymer by following the procedure of Example 11.

Example 16

The coolant grade polymers obtained in Examples 11 to 15 and Controls 3 to 6 were tested for residual amount of unaltered crosslinking agents. The simple coolant materials produced respectively from these polymers were placed in a refrigerator kept at −18° C., left standing therein overnight, removed from the refrigerator into a room kept at 24° C., and examined them for softness by the touch with hands. The coolant materials were each subjected to 30 cycles of The freezing and thawing treatments mentioned above. After the last cycle, they were examined for softness. The results are shown in Table 8.

It is clearly noted from Table 8 that the coolant materials of Examples 11 to 15 retained softness during the course of freezing and possessed outstanding durability in the repeated use through the cycles mentioned above. In constract, the coolant grade polymer obtained by polymerizing a monomer component containing no hydroxyl group-containing monomer (Control 3) and the coolant grade polymer which had not undergone the heat treatment for crosslinking the hydroxyl group and the carboxyl group (Control 6) possessed water absorption ratios exceeding 50 times to their own weights and exhibited poor softness during the course of freezing. The coolant grade polymer which omitted the inclusion of the hydroxyl group-containing monomer and instead contained the cross-linking agents in an increased amount (Control 4) was found to contain a harmful amount of residual cross-linking agents. The coolant material using a coolant grade polymer possessing a water absorption ratio of no more than 3 times to its own weight (Control 5) was found to exhibit inferior softness during the course of freezing.

TABLE 8

|  | Water absorption ratio (times) | Amount of unaltered crosslinking agent (ppm) (Note 1) | Softness during the course of freezing | State after repeated use through 30 through cycles (Note 3) |
|---|---|---|---|---|
| Example |  |  |  |  |
| 11 | 18.5 | N.D. (Note 2) | Soft | ○ |
| 12 | 18.5 | " | " | ○ |
| 13 | 15.5 | " | " | ○ |
| 14 | 8.3 | " | " | ○ |
| 15 | 5.5 | " | " | ○ |
| Control |  |  |  |  |
| 3 | 152 | " | Hard | X |
| 4 | 35.5 | 300 | Slightly hard | X |
| 5 | 0.7 | N.D. | Hard | X |
| 6 | 90.2 | " | " | X |

(Note 1) Amount of unaltered crosslinking agent: Amount of residual N,N'-methylene bisacrylamide detected in dry polymer.
(Note 2) N.D. Not detectable
(Note 3) The state after 30 cycles of the alternative freezing and thawing treatment was rated on a two-point scale, wherein: ○ Stands for substantial absence of change in softness during the course of freezing from the level during the first cycle. X Stands for hardness during the course of freezing.

Example 17

The coolants obtained in Examples 11 to 15 and Controls 3, 4 and 6 were each placed in an Erlenmeyer flask fitted with a ground stopper and having an inner volume of 1 liter, stoppered airtightly, placed in a drier kept at 50° C., and left standing therein for one month. Simple coolant materials were produced by placing the coolants each in a bag of polyethylene 18 cm × 27 cm in area and closing the open end of the bag. The coolant materials were tested for softness during the course of freezing and examined for the behavior of softness after 30 cycles of the alternating freezing and thawing treatment by following the procedure of Example 14. The results are shown in Table 9.

It is clearly noted from the results of Table 9 that the coolant materials of Example 11 to 15, even after one month's standing at 50° C., retained their outstanding properties i.e. softness, cooling property, and durability in the repeated use through 30 cycles of the treatment. In contrast, the coolant materials of Controls 3, 4, and 6 had their contents deteriorated to the state of honey.

Example 18

The coolants of the polymers obtained in Examples 11 to 15 and Controls 3, 4, and 6 were each placed in an Erlenmeyer flask having an inner volume of 1 liter, stoppered airtightly, and left standing for one month on a concrete base coated in white. The concrete base was located where no obstacle was allowed to intercept the direct sunlight impinging on the flask. After the standing, simple coolant materials were produced by placing the coolants each in a bag of polyethylene 18 cm × 27 cm in area and closing the open end. The coolant materials were tested for softness during the course of freezing, cooling property, and the state of coolant after 30 cycles of the alternative freezing and thawing treatment by following the procedure of Example 16. The results are shown in Table 10.

It is clearly noted from the results of Table 10 that the coolants of Examples 11 to 15, even after the exposure to the sunlight, retained their outstanding properties, i.e. softness during the initial stage of freezing and durability after the repeated use, intact in much the same manner as in Example 16. In contrast, the coolant materials of Controls 3, 4, and 6 had their contents degraded to the state of honey.

TABLE 9

|  | Softness during the course of freezing | State after repeated use through 30 cycles |
|---|---|---|
| Example |  |  |
| 11 | Soft | ○ |
| 12 | " | ○ |
| 13 | " | ○ |
| 14 | " | ○ |
| 15 | " | ○ |
| Control |  |  |
| 3 | Hard | X |
| 4 | " | X |
| 6 | " | X |

*The softness and the state indicated in this table are examined in the same manner as those of Table 8.

TABLE 10

|  | Softness during the course of freezing | State after repeated use through 30 cycles |
|---|---|---|
| Example |  |  |
| 11 | Soft | ○ |
| 12 | " | ○ |
| 13 | " | ○ |
| 14 | " | ○ |
| 15 | " | ○ |
| Control |  |  |
| 3 | Hard | X |
| 4 | " | X |
| 6 | " | X |

*The softness and the state indicated in this table are examined in the same manner as those of Table 8.

Example 19

A hydrophilic polymer (I) was obtained by following the procedure of Example 1, except that a monomer component composed of 75 mol % of sodium acrylate, 20 mol % of acrylic acid, 4.95 mol % of 2-hydroxyethyl acrylate, and 0.05 mol % of N,N'-methylene bisacrylamide was prepared in the form of an aqueous solution containing the monomer component in a concentration of 37% by weight and the time for the heat treatment performed on the polymer was changed to 2 hours. This polymer was found to possess a water absorption ratio of 21 times to its own weight and a moisture absorption ratio of 105% by weight.

Example 20

A hydrophilic polymer (II) was obtained by preparing a hydrated gel by following the procedure of Example 1, except that a monomer component composed of 67.5 mol % of sodium acrylate, 22.5 mol % of acrylic acid, 9,95 mol % of 2-hydroxyethyl acrylate, and 0.05 mol % of N,N'-methylene bisacrylamide was used in the form of an aqueous solution containing the monomer component in a concentration of 37% by weight, drying the hydrated gel in an ordinary hot air drier at 100° C. for 2 hours, comminuting the dried gel, and heat treating the polymer powder in a still drier at 180° C. for 3 hours. The polymer (II) was found to possess a water absorption ratio of 5 to times its own weight and a moisture absorption ratio of 95% by weight.

Examples 21 and 22 and Controls 7 to 9

Coating materials of working examples and controls were prepared by mixing varying raw materials in varying proportions indicated in Table 11.

They were obtained by sequentially adding the raw materials to a high-speed mill set to rotation from the beginning.

The coating materials and the films formed of the coating materials were tested for varying physical properties indicated in Table 11.

TABLE 11

| | Example 21 | Example 22 | Control 7 | Control 8 | Control 9 |
|---|---|---|---|---|---|
| Acryl emulsion (1) | 100 | 100 | 100 | 100 | 100 |
| Dispersant (2) | 0.5 | 0.5 | 0.5 | 1.0 | 1.0 |
| Hydrophilic polymer II | 2.0 | — | — | — | — |
| Hydrophilic polymer I | — | 12 | — | — | — |
| Highly absorbent resin A (3) | — | — | 4 | — | — |
| Highly absorbent resin B (4) | — | — | — | — | 10 |
| Diatomaceous earth (5) | — | — | — | 100 | — |
| Heavy calcium carbonate (6) | 50 | 50 | 50 | 30 | 50 |
| Titanium dioxide (7) | 20 | 20 | 20 | 20 | 20 |
| Tackifier (8) | 2 | 2 | 1 | 2 | 2 |
| Film-forming auxiliary (9) | 5 | 5 | 5 | 5 | 5 |
| Defoaming agent (10) | 1 | 1 | 1 | 1 | 1 |
| Water | 83 | 104 | 1265 | 110 | 152 |
| Concentration (%) | 52 | 47 | 9 | 56 | 40 |
| Viscosity (CPS) (11) | 38,000 | 42,000 | 187,000 | 41,000 | 32,000 |
| Dew-preventing property | ⊚ | ⊚ | ⊚ | X | X |
| Speed of water absorption | ⊚ | ⊚ | ⊚ | X | X |
| Water absorption ratio | ⊚ | ⊚ | ⊚ | ○ | ⊚ |
| Moisture-releasing ratio | ⊚ | ○ | X | ⊚ | ○ |
| Durability | ⊚ | ⊚ | X | ⊚ | X |
| Surface smoothness of film | ⊚ | ○ | X | ⊚ | ○ |

Notes:
(1) Acryl emulsion: Product of Nippon Shokubai Kagaku Kogyo Co., Ltd. marketed under trademark designation of "Acryset 202E"
(2) Dispersant: Product of Nippon Shokubai Kagaku Kogyo Co., Ltd. marketed under trademark designation of "Acrylic DL-40S"
(3) Highly absorbent resin A: Product of Nippon Shokubai Kagaku Kogyo Co., Ltd. marketed under trademark designation of "Aqualic CA" having a water absorption ratio of 250 times to its own weight and a hygroscopicity of 110% by weight
(4) Highly absorbent resin B: Product of Sumitomo Chemical Industries Co., Ltd. marketed under trademark designation of "Sumicagel R-30" having a water absorption ratio of 25 times to its own weight and a hygroscopicity of 6% by weight
(5) Diatomaceous earth: Marketed by Tokyo Kogyo Boeki Shokai under trademark designation of "Sellaite 281"
(6) Heavy calcium carbonate: Product of Nitto Funka Kogyo K.K. marketed under product code of "NS #30"
(7) Titanium dioxide: Product of Teikoku Kaka K.K. marketed under product code of "JR-701"
(8) Tackifier: Product of Union Carbide marketed under trademark designation of "Cellosize OP-4400" in the form of an aqueous 2.5% solution.
(9) Film-forming auxiliary: Marketed by Nagase Sangyo under trademark designation of "Texanol"
(10) Defoaming agent: Product of Shinetsu Silicon K.K. marketed under trademark designation of "Silicon KM-72"
(11) Viscosity: BL type viscosimeter, No. 4 roller, 6 rpm at 25° C.

The times of test involved and the procedures therefor are as shown below.

(A) Dew-preventing property

A sample was applied on an aluminum juice can in an amount calculated to produce a dry film 1 mm in thickness and dried at room temperature for 7 days. Then, the juice can was cooled to about 5° C. by filling the can with water and ice. The coated juice can was kept standing in a constant temperature and constant humidity bath kept at a temperature of 20° C. and a relative humidity of 90% and held under continued visual observation as to the occurrence of dew on the surface of the film. The formation of dew was rated on a three-point scale, wherein:

⊚ stands for tatal absence of dew condensation in 30 minutes.
○ stands for slight dew condensation in 30 minutes.
X stands for dew condensation and consequent fall of water drops in 30 minutes.

(B) Speed of water absorption

A dry sheet (2 mm in thickness) was prepared from a sample coating material. One drop (about 0.05 cc) of water was dropped through a pipet onto the dry sheet. The time was clocked between the landing of the water drop on the dry sheet and the disappearance of the water drop due to absorption by the dry sheet. The speed of water absorption was rated by a three-point scale, wherein:

⊚ stands for no more than 2 minutes.
○ stands for 2 to 9 minutes.
X stands for no less than 9 minutes.

The dry sheet was produced by setting a frame adapted to mold a dry film 2 mm in thickness on a mold release paper, casing a given sample of coating material in the cavity of the frame, smoothening the surface of the cast sample with a glass rod, and allowing the cast sample to dry at room temperature for 7 days.

(C) Water absorption ratio

A dry sheet (2.0 mm thick × 50 mm × 100 mm) was prepared from a given sample coating material, immersed in water at 20° C. for 3 hours. The wet sheet was then tested for water content. The water absorption ratio was rated on a three-point scale, wherein:
- ⊚ stands for no less than 80% by weight of absorption ratio.
- ○ stands for 50 to 80% by weight of absorption ratio.
- X stands for no more than 50% by weight of absorption ratio.

$$\text{Water absorption ratio (\%)} = \frac{\text{Sheet weight (g) after immersion} - \text{sheet weight (g) before immersion}}{\text{Sheet weight (g) before immersion}}$$

(D) Moisture releasing ratio

A sample sheet which had undergone the test for water absorption ratio was left standing in a constant temperature constant-hyumidity bath kept at a temperature of 20° C. and a relative humidity of 40%. The sheet was then tested for water content. The moisture releasing ratio was rated on a three-point scale, wherein:
- ⊚ stands for no more than 2% by weight of water content.
- ○ stands for 2 to 10% by weight of water content.
- X stands for no less than 10% by weight of water content.

$$\text{Moisture release ratio (\%)} = \frac{\text{Sheet weight (g) before moisture release} - \text{sheet weight (g) after moisture release}}{\text{Sheet weight (g) before moisture release}}$$

(E) Durability

A film of a given sample polymer was subjected to 10 cycles of the alternative absorption and moisture release treatment. After each cycle, the film surface was visually examined for possible abnormal phenomenon before it was subjected to the subsequent cycle. The durability was rated on a three-point scale, wherein:
- ⊚ stands for absence of abnormal phenomenon after 10 cycles.
- ○ stands for softening of film and slight occurrence of crack after 10 cycles.
- X stands for separation of the polymer during immersion in water after the second cycle.

(F) Surface smoothness of film

A given sample coating material was applied on a slate plate in an amount calculated to produce a dry film 1 mm in thickness. The applied coating material was dried at room temperature for 7 hours. Then, the produced film was immersed in water at 20° C. for 24 hours. The film removed from the water was visually examined for surface smoothness. The surface smoothness was rated on a three-point scale, wherein:
- ⊚ stands for satisfactory smoothness free from crack.
- ○ stands for slightly poor surface smoothness accompanied by slight occurrence of cracks.
- X stands for inferior surface smoothness accompanied by occurrence of cracks and separation of polymer.

What is claimed is:

1. A method for the production of a hydrophilic polymer having a water absorption capacity thereof 1 to 30 times of its own weight, which method comprises:
   i) preparing a monomer component comprising (a) 2 to 25 mol % of a hydroxyl group-containing alpha, beta-ethylenically unsaturated monomer, (b) 5 to 30 mol % of a carboxyl group-containing alpha, beta-ethylenically unsaturated monomer, (c) 93 to 45 mol % of a carboxylate group-containing alpha, beta-ethylenically unsaturated monomer, providing that the total of (b) and (c) is in the range of 98 to 75 mol %, aqueous solution, and d) cross-linking monomer possessing at least 2 unsaturated groups in its molecular unit, the cross-linking monomer being present in an amount in the range of 0.001 to 0.5 mol % based on said monomer component;
   ii) polymerizing said monomer component in the presence of a radical polymerization initiator, and
   iii) heating treating at a temperature in the range of 150 to 250° C. for a period in the range of 10 minutes to 20 hours, the resultant polymer thereby causing the hydroxyl group and carboxyl group possessed by said polymer to react with each other and form a cross-linked structure.

2. A method according to claim 1, wherein said carboxylate group-containing alpha,beta-ethylenically unsaturated monomer is an alkali metal salt or ammonium salt of (meth)acrylic acid.

3. A method according to claim 1, wherein said carboxyl group-containing alpha,beta-ethylenically unsaturated monomer is at least one member selected from the class consisting of acrylic acid, methacrylic acid, and maleic acid.

4. A method according to claim 1, wherein said hydroxyl group-containing alpha,beta-ethylenically unsaturated monomer is 2-hydroxyethyl (meth)acrylate.

5. A method according to claim 1, wherein said water absorption capacity is in the range of 2 to 20 times to its own weight.

6. A method according to claim 1, wherein the proportion of (a) said hydroxyl group-containing alpha,-beta-ethylenically unsaturated monomer is in the range of 5 to 20 mol %, that of (b) said carboxyl group-containing alpha,beta-ethylenically unsaturated monomer is in the range of 10 to 30 mol %, and that of (c) said carboxylate group-containing alpha,beta-ethylenically unsaturated monomer is in the range of 85 to 50 mol %, providing that the total of (b) and (c) is in the range of 95 to 80 mol %.

7. A method according to claim 1, wherein said polymer kept in the air at a temperature of 20° C. and a relative humidity of 90% has hydrogroscopicity of in the range of 30 to 130% by weight.

8. A method according to claim 1, wherein said polymer kept in the air at a temperature of 20° C. and a relative humidity of 90% has hydrogroscopicity of in the range of 50 to 130% by weight.

9. A method according to claim 1, wherein said heat treatment is carried out at a temperature in the range of 150 to 250° C. for a period in the range of 10 minutes to 10 hours.

10. A method according to claim 1, wherein said heat treatment is carried out while or after the polymer obtained by said aqueous solution polymerication is dried.

* * * * *